United States Patent [19]

Hirate

[11] Patent Number: 4,666,793

[45] Date of Patent: May 19, 1987

[54] THIN-FILM ELECTROLUMINESCENT DEVICE OF EMITTING-LIGHT-COLOR CHANGEABLE TYPE

[76] Inventor: Takashi Hirate, 50-23, Tobehoncho, Nishi-ku, Yokohama-shi, Kanagawa-ken, Japan

[21] Appl. No.: 700,014

[22] Filed: Feb. 8, 1985

[30] Foreign Application Priority Data

Apr. 10, 1984 [JP] Japan ............................... 59-071624

[51] Int. Cl.[4] ......................... H01J 1/62; H01J 63/04; B32B 9/00; B32B 19/00

[52] U.S. Cl. .................................... 428/690; 428/691; 428/917; 313/503; 313/509

[58] Field of Search ................ 313/503, 509; 428/690, 428/691, 917, 209, 210, 901

[56] References Cited

U.S. PATENT DOCUMENTS 3,294,569 12/1966 Messineo et al. ............... 428/690 X
3,728,594 4/1973 Yim et al. ............................ 313/503
4,099,091 7/1978 Yamazoe et al. ................... 313/509
4,418,118 11/1983 Lindors ........................... 313/509 X
4,442,377 4/1984 Higton et al. ....................... 313/503

FOREIGN PATENT DOCUMENTS 2432503 2/1975 Fed. Rep. of Germany ...... 313/503

OTHER PUBLICATIONS

Okamoto et al., Bright Green El in Thin–Film . . . , Appl. Phys. Let., vol. 35, No. 7, 10/79.

Hale et al., Multi–Color Thin Film Emittors, Int. Electron Dev. Mtg, Tech Dig, 1980, pp. 719–722.

*Primary Examiner*—Nancy Swisher

*Attorney, Agent, or Firm*—Vorys, Sater, Seymour & Pease

[57] ABSTRACT

A thin-film light emitting element in which the light color emitted from the light emitting element can be voluntary changed in accordance with an electric power source applied to the light emitting element by utilizing scattering, accumulation, and discharge of an electric charge in a gate layer disposed between active layers of the light emitting element.

6 Claims, 2 Drawing Figures

THIN-FILM ELECTROLUMINESCENT DEVICE OF EMITTING-LIGHT-COLOR CHANGEABLE TYPE

BACKGROUND OF THE INVENTION

1. Field of the Invention

The present invention relates to a thin-film electroluminescent device of the emitting-light color-changeable type, in which the color of the light emitted from the device is changeable in accordance with a driving condition applied to the element.

2. Description of the Prior Art

According to a conventional thin-film electroluminescent device, the light emitted from the device is decided to a single color in accordance with the impurity doped in an active layer of the device. Therefore, it is impossible to change the color of the light emitted from the device by changing an electric energy condition applied to the device, such as a voltage, frequency or the like.

SUMMARY OF THE INVENTION

An object of the present invention is to provide a thin-film electroluminescent device, the light color of which is changeable in accordance with the change of an external electric power source by providing a novel intermediate layer (hereinafter referred to simply as a gate layer) between the active layers of the device.

BRIEF DESCRIPTION OF THE DRAWINGS

The above and other objects, features and advantages of the present invention will be more clear from the following description with reference to the accompanying drawings, in which.

DESCRIPTION OF THE PREFERRED EMBODIMENTS

Figure 1:
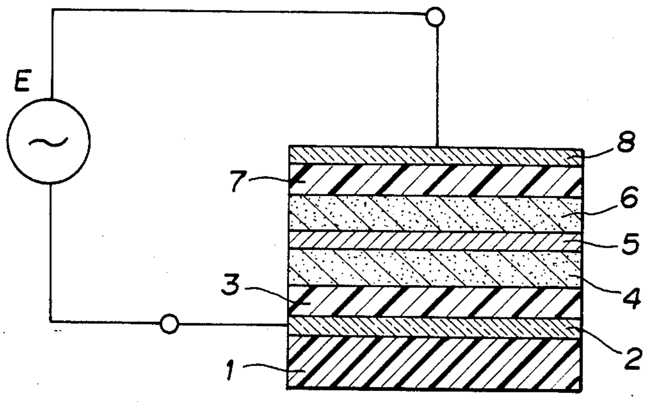
FIG. 1 is a schematical sectional view of an embodiment of the present invention.

Referring to FIG. 1 an embodiment of the present invention is shown. In FIG. 1, the thin-film electroluminescent device has a multi-layered construction composed of the substrate 1, a transparent electrode layer 2 mounted on the substrate 1, a first insulation layer 3 mounted on the electrode layer 2, a first active layer 4 on the first insulation layer 3, a gate layer 5 on the first active layer 4, a second active layer 6 on the gate layer 5, a second insulation layer 7 on the second active layer 6, and an electrode layer 8 on the second insulation layer 7, in order. In this case, the emitted light from the first active layer 4 is arranged to be different from the emitted light from the second active layer 6.

Referring to materials for the first and second active layers, for example, the first active layer 4 may be composed of the mixture of zinc sulfide ZnS and samarium trifluoride $SmF_3$ to emit red light. On the other hand, the second active layer 6 may be composed of the mixture of zinc sulfide ZnS and erbium trifluoride $ErF_3$ to emit green light. The gate layer 5 may be composed of a thin film having thickness of several tens Angstrom to several hundred Angstrom, and of samarium fluoride and metal or the like. The gate layer 5 acts as a layer for scattering the electric charge passing the gate layer 5, and for accumulating and discharging the electric charge at the gate layer 5 and at the interface between the gate layer 5 and the first active layer 4, or between the gate layer 5 and the second active layer 6.

When a voltage E from an external electric power source is applied to the pair of the electrode layers 2 and 8, the electric charge, electron or the hole runs within the first and second active layers 4 and 6 thereby to emit light from the respective active layers 4 and 6. In this case, the electric charge running from the first active layer 4 to the second active layer 6, or from the second active layer 6 to the first active layer 4, is scattered at the gate layer 5, or accumulated at the layer 5, the interface between the layers 5 and 4, and the interface between the layers 5 and 6, and is interacted with the already accumulated electric charge and the interface states. Such scattering, accumulation and interaction correspond to the magnitude of the voltage of the external electric power source, the polarity thereof and the, frequency and waveform thereof, so that the intensity of the light emitted from the first and second active layers 4 and 6 can be changed in accordance with the voltage, frequency, polarity and/or the waveform. Thus, the color of the light seen from the side of the transparent electrode 2 or 8 can be controlled by the external electric power source. Either of the first insulation layer 3 or the second insulation layer 7, or both may be omitted.

Figure 2:
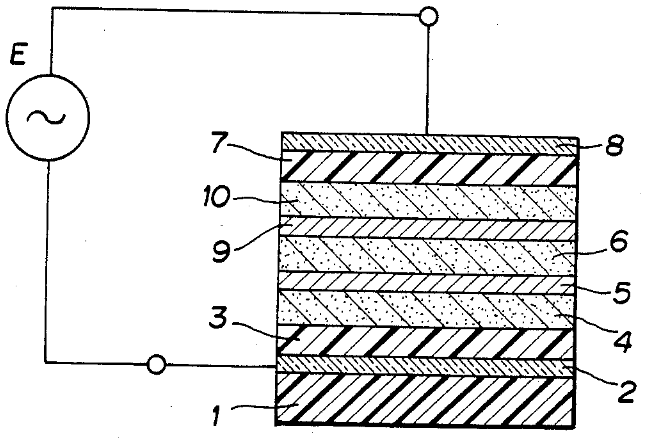
FIG. 2 is a schematical sectional view of another embodiment of the present invention.

Referring next to FIG. 2 an another embodiment of the present invention is shown. In FIG. 2 the same numeral number as that shown in FIG. 1 is used for the same or equivalent element to that as shown in FIG. 1.

In comparison, the embodiment of FIG. 2 is different from the embodiment of FIG. 1 at the point that a second gate layer 9 and a third active layer 10 are newly added into the lamination as shown in FIG. 1.

Assuming that the first active layer 4, the second active layer 6 and the third active layer 10 are provided to emit either of red, green, and blue respectively, the first active layer 4 may be composed of the mixture of zinc sulfide ZnS and thulium trifluoride $TmF_3$ to emit blue light, the second active layer 6 may be formed by the mixture of zinc sulfide ZnS and samarium trifluoride $SmF_3$ to emit red light, and the third active layer 10 may be composed of the mixture of zinc sulfide ZnS and erbium trifluoride $ErF_3$ to emit green light. The function of electric charge, such as scattering, accumulation and discharge, as mentioned with respect to the gate layer 5 in the previous embodiment, is also effected by the first and second gate layers 5 and 9 in this embodiment. Therefore, a relative ratio of light intensity of the plural active layers 4, 6 and 10 can be voluntary changed in accordance with the change of the magnitude, polarity, frequency and waveform of the external electric power source, thereby to emit a voluntary color of light.

As mentioned above, there are provided a single gate layer and two gate layers in the first and second embodiments respectively. Further multi-layers of the gate layers, such as three or four layers, may be provided between active layers thereby increasing color variation of the emitted light.

Although the present invention has been described in its preferred form with a certain degree of particularity, it is understood that the present disclosure of the preferred form has been changed in the details of construction, and the combination and arrangement of parts may be modified without departing from the spirit and the scope of the present invention as hereinafter claimed.

I claim:

1. In a thin film electroluminescent device of the emitting-light color-changeable type, wherein the color of the light emitted from the device is changeable in accordance with an electrical condition applied to the device, said device comprising a substrate, at least one transparent electrode layer, and an insulation layer mounted on the electrode layer, and a second insulation electrode layer and a second electrode, said electrodes being arranged to cooperate electrically with a source of electrical power, the improvement comprising the combination of:

a first active layer to emit red light, said first active layer being composed of a mixture of zinc sulfide and samarium trifluoride;

a second active layer to emit green light, said second active layer being composed of a mixture of zinc sulfide and erbium trifluoride; and a gate layer responsive to current from said source and being composed of a thin film of samarium fluoride, said gate layer being interposed between said first active layer and said second active layer and acting as a charge accumulating and scattering layer which transmits current from said source to effect activation of said pair of active layers by scattering the electric charge passing said gate layer, for accumulating and discharging the electric charge at the gate layer and at the interface between said at least one of the gate layer and either said first active layer or said second active layer, and interacting said charge with an accumulated charge at said gate layer and said interface whereupon the intensity of the light emitted from said first and second active layers is changed in accordance with the voltage, frequency, polarity and waveform of the source of electric power so that the color of light seen from the side of the transparent electrode is controlled by the external electrical power source.

2. In a thin film electroluminescent device of the emitting-light color-changeable type, wherein the color of the light emitted from the device is changeable in accordance with an electrical condition applied to the device, said device comprising a substrate, at least one transparent electrode layer, and an insulation layer mounted on the electrode layer, and a second insulation electrode layer and a second electrode, said electrodes being arranged to cooperate electrically with a source of electrical power, the improvement comprising the combination of:

a first active layer to emit blue light, said first active layer being composed of a mixture of zinc sulfide and thulium trifluoride to emit blue light;

a second active layer to emit red light, said second active layer being composed of a mixture of zinc sulfide and samarium trifluoride to emit red light;

a third active layer to emit green light, said third active layer being composed of a mixture of zinc sulfide and erbium trifluoride to emit green light; and a first gate layer interposed between said first active layer and said second active layer; and a second gate layer interposed between said second active layer and said third active layer, each of said first and second gate layers being composed of a thin film of samarium fluoride and metal to act as a charge accumulating and scattering layer which transmits current from said source to effect activation of said pair of active layers by scattering the electric charge passing a gate layer, for accumulating and discharging the electric charge at each respective gate layer and at the interface between a gate layer and an adjacent active layer, and interacting said charge with an accumulated charge at said gate layer and said interface so that the intensity of the light emitted from the active layers can be changed in accordance with the voltage, frequency, polarity and waveform of the electric power source, whereupon the color of light seen from the side of the transparent electrode is controlled by the external electric power source.

3. A thin film electroluminescent device of an emitting-light, color-changeable type comprising a pair of electrodes, at least one of which is composed of transparent material; an external electric power source for applying a voltage across said pair of electrodes; at least one pair of active electrodes disposed between said electrodes, one of said pair of active electrodes comprising a first active layer composed of a material for emitting a light of a first color, the other of said pair of active electrodes composed of a material for emitting light of a second color; the improvement comprising at least one gate layer responsive to current from said source disposed between said first and said second active layers, said gate layer being selected from a material and positioned relative to said first and second active layers to act as a charge accumulating and scattering layer which transmits current from said source to effect activation of said pair of active layers by scattering the electric charge passing said gate layer, for accumulating and discharging the electric charge at the gate layer and at the interface between the gate layer and either of said first active layer or said second active layer, and interacting said charge with an accumulated charge at said gate layer and said interface so that the intensity of the light emitted from the first and second active layers is changed in accordance with the voltage, frequency, polarity, and waveform of the source of electric power, whereupon the color of the light seen from the side of the transparent electrode is controlled by the external power source.

4. A device as set forth in claim 3, wherein one of said pair of active layers comprises a first active layer composed of a mixture of zinc sulfide and samarium trifluoride, the other of said pair of active layers comprises a second active layer composed of zinc sulfide and erbium trifluoride and said gate layer is composed of samarium trifluoride.

5. A thin film electroluminescent device of an emitting-light, color-changeable type comprising a pair of electrodes, at least one of which is composed of transparent material; an external electric power source for applying the voltage across said pair of terminals; a plurality of active layers disposed between said electrodes, said plurality of active layers comprising a first active layer for emitting a light of a first color, a second active layer for emitting light of a second color, and a third active layer for emitting light of a third color, the improvement comprising a first gate layer disposed between said first and second active layers, and a second gate layer disposed between said second active layer and said third active layer, each of said first and second gate layers selected from a material for acting as a charge accumulating and scattering layer which transmits current from said source to effect activation of said pair of active layers by scattering the electric charge passing said gate layer, for accumulating and discharging the electric charge at the gate layer and at the interface between either of said gate layers and its adjacent active layers, and interacting said charge with an accumulated charge at said gate layer and said interface so that the intensity of the light emitted from the active layers is changed in accordance with the voltage, frequency, polarity and waveform of the source of electric power, whereupon the color of light seen from the side of the transparent electrode is controlled by the external electric power source.

6. A device as set forth in claim 5 wherein said first active layer is composed of a mixture of zinc sulfide and thulium trifluoride, said second active layer is composed of a mixture of zinc sulfide and samarium trifluoride, said third active layer is composed of a mixture of zinc sulfide and erbium trifluoride, said first gate layer is composed of samarium fluoride, and said second gate layer is composed of metal.

* * * * *